(12) United States Patent
Kwon

(10) Patent No.: US 8,851,103 B2
(45) Date of Patent: Oct. 7, 2014

(54) MICROFLUIDIC VALVE SYSTEMS AND METHODS

(71) Applicant: Jae Wan Kwon, Columbia, MO (US)

(72) Inventor: Jae Wan Kwon, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 13/930,356

(22) Filed: Jun. 28, 2013

(65) Prior Publication Data

US 2013/0284956 A1    Oct. 31, 2013

Related U.S. Application Data

(63) Continuation-in-part of application No. 12/565,479, filed on Sep. 23, 2009, now abandoned.

(60) Provisional application No. 61/192,947, filed on Sep. 23, 2008.

(51) Int. Cl.
*F16K 13/10* (2006.01)
*F16K 99/00* (2006.01)

(52) U.S. Cl.
CPC ......... *F16K 99/0019* (2013.01); *F16K 99/0042* (2013.01); *F16K 99/0021* (2013.01); *F16K 2099/0092* (2013.01); *F16K 99/0051* (2013.01)
USPC ................... 137/251.1; 137/831; 251/129.01; 251/129.06; 347/20

(58) Field of Classification Search
CPC . F16K 13/10; F16K 99/0001; F16K 99/0017; F16K 2099/0084
USPC ............ 137/251.1, 909, 827, 829, 831; 251/129.01, 129.06, 11, 65; 347/84, 347/20, 21, 55
See application file for complete search history.

(56) References Cited

U.S. PATENT DOCUMENTS

| | | | | |
|---|---|---|---|---|
| 4,928,125 | A * | 5/1990 | Iino | 347/54 |
| 6,379,929 | B1 * | 4/2002 | Burns et al. | 435/91.2 |
| 6,408,884 | B1 * | 6/2002 | Kamholz et al. | 137/827 |
| 6,415,821 | B2 * | 7/2002 | Kamholz et al. | 137/827 |
| 6,450,203 | B1 * | 9/2002 | Backhouse et al. | 137/807 |
| 7,527,358 | B2 * | 5/2009 | Sugahara | 347/54 |
| 8,172,375 | B2 * | 5/2012 | Sugahara | 347/84 |

* cited by examiner

*Primary Examiner* — Matthew W Jellett
(74) *Attorney, Agent, or Firm* — Polster Lieder

(57) ABSTRACT

The present disclosure provides a mini-scale microfluidic valve including a valve housing disposed at a fluid dispensing orifice of a mini-scale microfluidic system dispensing nozzle. The valve housing comprises a base member having a base member orifice that aligns with the fluid dispensing orifice to provide a fluid dispensing pathway through which a system-fluid is dispensed from the system dispensing nozzle to an external ambient environment. The housing additionally comprises an open valve channel exposed to the external ambient environment and intersecting the fluid dispensing pathway. The valve further includes a liquid-film movably disposed within the open valve channel such that the liquid-film is exposed to the external ambient environment. The liquid-film comprises a substantially non-volatile, immiscible liquid, and a valve control subsystem structured and operable to control movement of the liquid-film within the open valve channel to selectively cover and uncover the base member orifice.

18 Claims, 13 Drawing Sheets

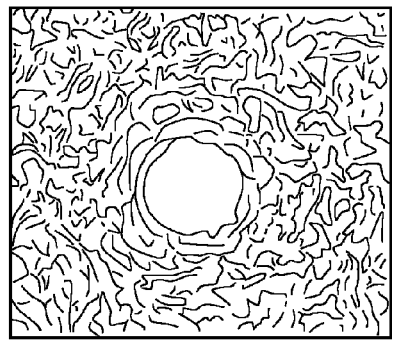 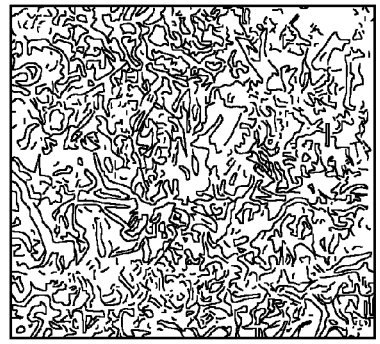
FIG. 1A    FIG. 1B
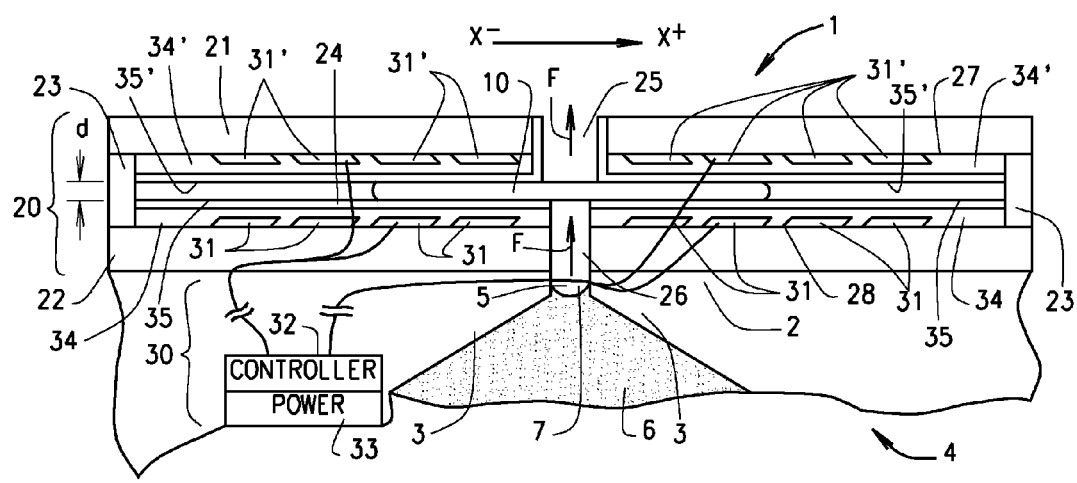
FIG. 2A

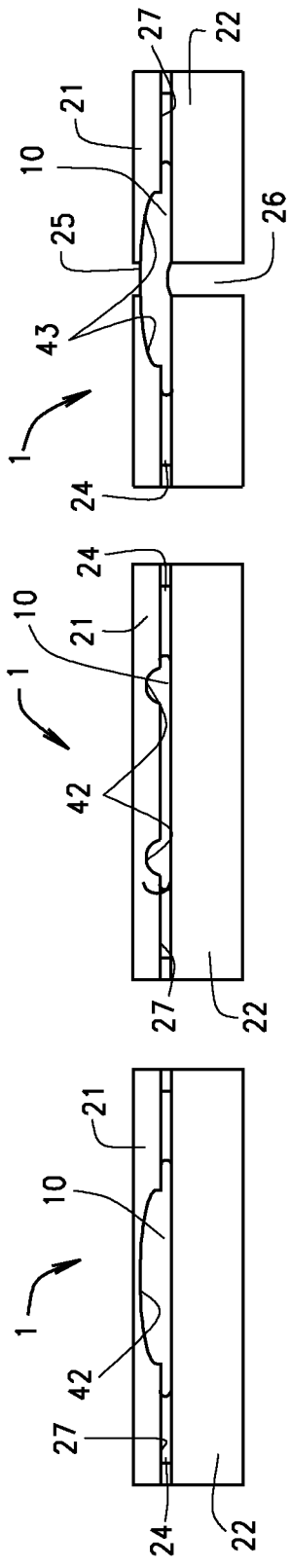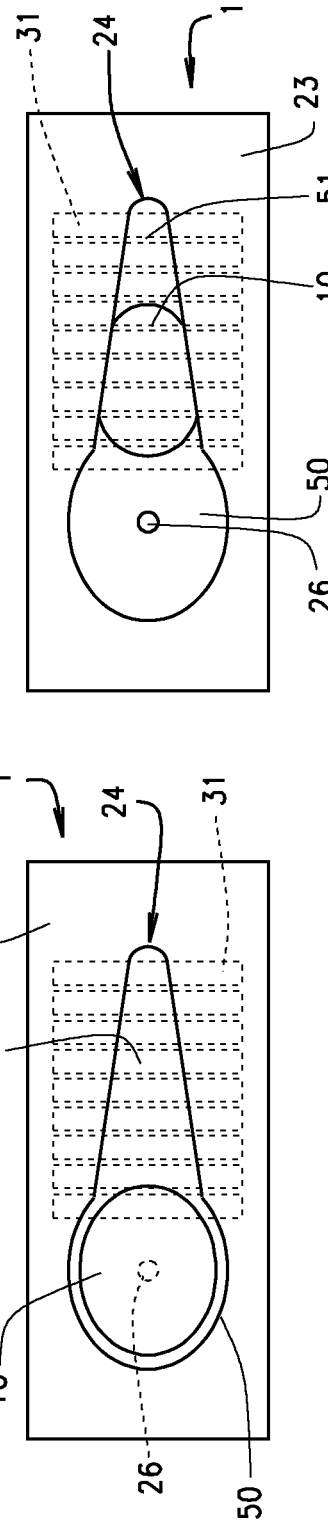

MICROFLUIDIC VALVE SYSTEMS AND METHODS

CROSS-REFERENCE TO RELATED APPLICATIONS

This application is a continuation-in-part of U.S. patent application Ser. No. 12/565,479 filed on Sep. 23, 2009, which claims the benefit of U.S. Provisional Application No. 61/192,947 filed on Sep. 23, 2008. The disclosures of the above applications are incorporated herein by reference in their entirety.

FIELD

The present disclosure relates generally to microfluidic systems, such as inkjet printing systems, and more particularly to devices and methods preventing nozzle failure or orifice clogging problems in such microfluidic systems.

BACKGROUND

Generally, microfluidic systems, such as inkjet print heads, have many internal microfluidic channels and paths connected to the ambient environment through inlet and outlet ports. Liquid materials flow through the internal microfluidic channels are dispensed out from a nozzle tip. While the fluid within the system is completely isolated from the ambient environment, the fluid within a nozzle is typically exposed to air and subject to dry, thereby clogging the nozzle and/or internal microfluidic channels to clog, especially at the liquid-air interface. Often, such clogging is uncorrectable, rendering the system no longer usable. FIGS. 1A and 1B are illustrations of scanning electron microscope (SEM) pictures respectively illustrating an exemplary inkjet print head nozzle before and after clogging.

Nozzle clogging or failure affects the functionality and reliability of the respective microfluidic systems and squanders significant time and resources needed to repair or replace such microfluidic systems. For example, when the nozzle failure or clogging happens to a conventional ink printer head, a costly and difficult maintenance/repair process may have to be carried out for declogging of the failed orifices. Sometimes, the clogged nozzle as well as its print head has to be replaced. Furthermore, nozzle failure and clogging problems may hinder the adaptation of microfluidic systems in many biological applications, such as the droplet-on-demand technologies in drug discovery, genomics, and proteomics, or the bio-printing technologies that printing (or dispersing) bio-molecules and/or bio-analytical solutions by virtue of the precise volume control and accurate positioning without contact.

SUMMARY

Generally, in various embodiments, the present disclosure provides a mini-scale surface crawling microfluidic valve with or without a valve housing disposed at the outer surface of a fluid dispensing nozzle of a mini-scale microfluidic system. The valve housing comprises a base member having a base member orifice that aligns with the fluid dispensing nozzle to provide a fluid dispensing pathway through which a system-fluid is dispensed from the system dispensing nozzle to an external ambient environment. The valve additionally includes a liquid-film movably disposed on an outer surface of the nozzle where the liquid-film is exposed to the external ambient environment. The liquid-film comprises a substantially non-volatile, immiscible liquid. The valve further includes a valve control subsystem structured and operable to control movement of the liquid-film to selectively cover and uncover the nozzle.

BRIEF DESCRIPTION OF DRAWINGS

FIG. 1A is an illustration of a scanning electron microscope (SEM) image of an exemplary inkjet print head nozzle orifice that is not clogged with dried ink.

FIG. 1B is an illustration of a SEM image of the exemplary inkjet print head nozzle orifice shown in FIG. 1A being clogged with dried ink.

FIG. 2A is a schematic cross-sectional longitudinal side view of a microfluidic valve in a "Closed" state disposed on a tip of a microfluidic system nozzle and exemplarily illustrating a double-side electrode configuration, in accordance with various embodiments of the present disclosure.

FIG. 5A is a schematic cross-sectional lateral side view of the various microfluidic valve embodiments shown in FIGS. 2A through 4B, wherein an inner surface of a cover member of the microfluidic valve includes a stabilizing groove, in accordance with various embodiments of the present disclosure.

FIG. 5B is a schematic cross-sectional lateral side view of the various microfluidic valve embodiments shown in FIGS. 2A through 4B, wherein the inner surface of the cover member of the microfluidic valve includes a plurality of stabilizing grooves, in accordance with various other embodiments of the present disclosure.

FIG. 5C is a schematic cross-sectional lateral side view of the various microfluidic valve embodiments shown in FIGS. 2A through 4B, wherein an inner surface of a cover member of the microfluidic valve includes a stabilizing recess, in accordance with still other embodiments of the present disclosure.

FIG. 6A is a schematic cross-sectional top view of a microfluidic valve, such as that shown in FIG. 2A, in a "Closed" state, wherein a valve channel of the microfluidic valve includes a holding chamber and an elongated guiding channel, in accordance with various embodiments of the present disclosure.

FIG. 6B is a schematic cross-sectional top view of the microfluidic valve shown in FIG. 6A, in an "Open" state, in accordance with various embodiments of the present disclosure.

DETAILED DESCRIPTION

Figure 2B:
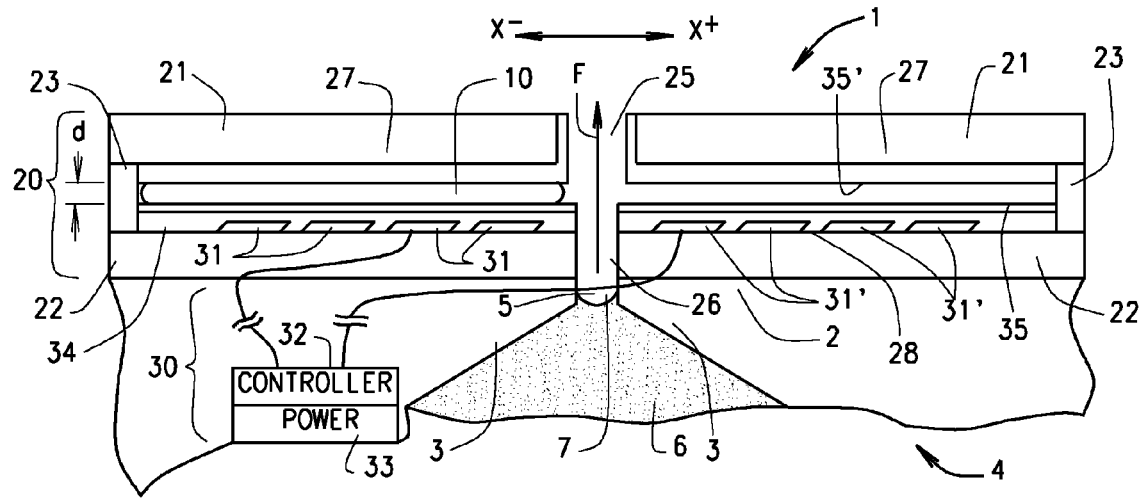
FIG. 2B is a schematic cross-sectional longitudinal side view of the microfluidic valve shown in FIG. 2A in an "Open" state disposed on the tip of the microfluidic system nozzle and exemplarily illustrating a single-side electrode configuration, in accordance with various embodiments of the present disclosure.

Unless otherwise defined, all technical and scientific terms used herein have the same meaning as commonly understood by one of ordinary skill in the art to which this disclosure belongs. All publications, patent applications, patents, and other references mentioned herein are incorporated by reference in their entirety.

In accordance with various embodiments of the present disclosure, a non-volatile and immiscible liquid droplet can be employed at a fluid-air interface of a nozzle orifice of a mini-scale microfluidic system, e.g., an inkjet print head nozzle orifice, to prevent the evaporation and drying of a volatile system-fluid, e.g., printer ink, within the nozzle orifice from which a volatile fluid is to be ejected. Generally, the non-volatile liquid forms a mini-scale substantially flat thin circular disk layer when sandwiched by two substrates that moves to cover the nozzle to protect the system-fluid (i.e., fluid stored within the microfluidic system) from exposure to ambient air exposure at the fluid-air interface when the system-fluid is not being ejected from the nozzle. Thus, the evaporation/drying speed of the system-fluid within the nozzle will be significantly reduced, and the nozzle orifice will remain unclogged.

Particularly, in various embodiments, the present disclosure provides a method to prevent nozzle failure of a microfluidic system due to clogging of the nozzle orifice caused by evaporation/drying of the system-fluid within the nozzle orifice. Generally, in such embodiments, the method includes disposing a non-volatile liquid droplet material (hereafter referred to as the liquid-film), at the nozzle orifice, at or substantially near the tip of the nozzle where the system-fluid would be dispensed from the nozzle to an external ambient environment (e.g., onto an external surface or substrate) and where ambient air would contact the system-fluid within the nozzle orifice when the system-fluid is not being dispensed from the nozzle, hereafter referred to as the orifice fluid-air interface. In addition to the liquid-film being non-volatile, the liquid-film is selected to be immiscible with the system-fluid.

As used herein, the terms volatile and non-volatile refer to the propensity of the respective fluid to evaporate when exposed to ambient air. For example, the system-fluid is described herein as being volatile, meaning that it has a high propensity to evaporate when exposed to ambient air, while the liquid-film is described herein as being non-volatile, meaning that it has a very low, or no, propensity to evaporate when exposed to ambient air.

In such embodiments, the method additionally includes moving the liquid-film away from the fluid-air interface when the microfluidic system is operated to eject the system-fluid from the nozzle orifice to the external ambient environment (e.g., onto an external surface of substrate), and moving the relatively large liquid-film to cover the mini-scale nozzle (i.e., cover the fluid-air interface of the orifice) when the microfluidic system is not operated to eject the system-fluid from the nozzle orifice to the external ambient environment. Hence, the liquid-film can be positioned on top of the nozzle at the orifice fluid-air interface to completely cover the nozzle orifice and prevent direct contact of the ambient air with the system-fluid retained within the nozzle.

It is envisioned that the liquid-film can be moved over and/or away from the nozzle orifice (i.e., over and/or away from the nozzle orifice fluid-air interface) by any suitable microfluidic driving mechanisms. For example, in various embodiments, the microfluidic driving mechanism can comprise an electrostatic, magnetic, pressure, ultrasonic, piezoelectric, electro-osmostic, thermal, or optical mechanism. Alternatively, in other embodiments, the liquid-film can be selectively moved over and/or away from the nozzle utilizing electrowetting principles, wherein the liquid-film can crawl on the nozzle surface and be pulled away from the orifice liquid-air interface very quickly. In yet other embodiments, the liquid-film can be moved over and/or away from the orifice fluid-air interface utilizing a set of competing magnetic forces.

More particularly, in various embodiments, the present disclosure provides a mini-scale microfluidic valve operable to control the opening and closing of one or more microfluidic system nozzle orifices to prevent drying out of a system-fluid retained in the nozzle. The microfluidic valve can include a pre-selected liquid-film disposed within a valve housing disposed on the nozzle tip, or alternatively, the microfluidic valve can comprise the liquid-film disposed uncovered and open directly on the outer surface of the nozzle tip. Additionally, the microfluidic valve includes a control means for controlling the movement of the liquid-film on the outer surface of the system to open and close (cover and uncover) the system nozzle. Particularly, the control means controls movements of the liquid-film to open (exposing) or close (blocking) the nozzle orifice. For example, when the system-fluid is to be ejected out through the nozzle to the external ambient environment, the liquid-film is moved to expose the system nozzle to allow passage (ejection) of the system-fluid. Conversely, when the system-fluid is not to be ejected, i.e., retained within the nozzle orifice, the liquid-film is moved back to block (or cover) the system nozzle, thereby sealing the system-fluid within the nozzle orifice and preventing direct exposure to the ambient air and preventing drying out of the system-fluid within, and clogging of, the nozzle orifice.

It should be understood that the systems and methods described herein are applicable to nozzle failure due to orifice clogging of any microfluidic system without departing from the scope of the present disclosure. For example, the systems and methods described herein can be applied to inkjet printer heads while also being suitable for many biological applications, such as the droplet-on-demand technologies in drug discovery, genomics, and proteomics, or the bio-printing technologies that printing (or dispersing) biomolecules and/or bio-analytical solutions by virtue of the precise volume control and accurate positioning without contact. It should also be understood that although for clarity and simplicity, the valve will be described herein regarding a single nozzle orifice, the mini-scale microfluidic valve described herein is equally application to simultaneously control the covering and uncovering of the fluid-air interfaces of a plurality of nozzle orifices, i.e., a nozzle having more than one fluid dispensing orifice.

Referring to FIGS. 1 through 12, the present disclosure generally provides a microfluidic valve 1, disposed on an outer surface 2, i.e., on the tip, of a fluid dispensing nozzle 3 of a microfluidic system 4, wherein the microfluidic valve 1 generally includes a liquid-film 10 and a valve control subsystem 30 for controlling movement of the liquid film 10 to cover and uncover at least one orifice 5 of the nozzle 3, as described further below.

Referring now to FIGS. 2A and 2B, in various embodiments, in addition to the liquid-film 10 and the valve control subsystem 30, the microfluidic valve 1 includes a valve housing 20. In various implementations, the valve housing 20 includes a cover member 21, a base member 22, an interstitial member 23, and a valve channel 24 formed by the cover member 21, base member 22, and interstitial member 23. The cover member 21 includes a cover orifice 25 that is coaxially aligned with a base orifice 26 included in the base member 22. The cover member 21 additionally includes a bottom, or inner, surface 27 that faces and is adjacent a top, or inner, surface 28 of the base member 22.

As illustrated in FIGS. 2A and 2B, the base member 22 of the microfluidic valve 1 is disposed on the outer surface 2 of the microfluidic system dispensing nozzle 3 such that the base orifice 26, and hence the cover orifice 25, is coaxially aligned with a nozzle orifice 5. The microfluidic system 4 is structured to house, retain or store a quantity of system-fluid 6 and dispense the system-fluid 6 via the dispensing nozzle 3. Thus, system-fluid 6 is typically retained within the system nozzle 3 up to or partially within the nozzle orifice 25.

The microfluidic valve 1 is shown in FIG. 2A in an "Closed" state or position (sometimes referred to as the "Stand By" state or position), wherein the liquid-film 10 is positioned, via the valve control subsystem 30, within the valve channel 24 such that the liquid-film 10 blocks a fluid dispensing path, or pathway, F defined by the coaxially aligned base and cover orifices 26 and 25. More particularly, when the microfluidic valve 1 is placed in the Closed state, the liquid-film 10 blocks a fluid-air interface 7 formed at or within the nozzle orifice 5 where ambient air will contact the system-fluid 6 within the nozzle orifice 5 if the fluid dispensing path F is not blocked by the liquid-film 10, as described herein. Accordingly, when the microfluidic valve 1 is placed in the Closed state, the liquid-film 10 forms a seal covering the base orifice 26. Particularly, the seal formed by the liquid-film 10 prevents, or significantly inhibits, ambient air from contacting the system-fluid 6 at the fluid-air interface 7 such that evaporation, or drying out, of the system-fluid 6 retained within the nozzle orifice 5 will be prevented, or significantly retarded, thereby preventing, or significantly retarding, clogging of the nozzle orifice 5.

Conversely, the microfluidic valve 1 is shown in FIG. 2B in an "Open" state or position, wherein the liquid-film 10 is positioned, via the valve control subsystem 30, within the valve channel 24 such that the liquid-film 10 exposes, i.e., does not block, the fluid dispensing path F defined by the coaxially aligned base and cover orifices 26 and 25. More particularly, when the microfluidic valve 1 is placed in the Open position, the liquid-film 10 is moved away from the orifice 26 to allow the system-fluid 6 to be dispensed from the microfluidic system 4, and more specifically from the microfluidic valve cover orifice 25, along the fluid dispensing path F to the external ambient environment (e.g., onto an external surface or substrate).

The liquid-film 10 can comprise any suitable non-volatile liquid, i.e. the evaporation speed of liquid is very slow or negligible, that is immiscible with a particular system-fluid 6 retained within a microfluidic system 4. For example, various types of liquid metals, such as mercury, indalloy, etc.; organic solutions, such as silicone oil, hydrocarbon, hexadecane, dodecane, fomblin, etc.; or ferrofluids may be employed. The size of the liquid-film 10 can be pre-determined according to the surface tension of the respective liquid, the size of the orifice 26, and the distance d between hydrophobic layers 35 and 35' described below.

In various embodiments, the liquid-film 10 is a liquid with a low surface tension, e.g. a silicone oil with a surface tension of approximately 20.6 mN/m. Silicone oil is highly immiscible with most aqueous solutions and has a dielectric constant of 2.75 and a dielectric strength of 390 KV. Additionally, silicone oil has a very low electrical conductivity of less than $10^{-10}$ cm/Ω and any dielectric liquid does not require any additional dielectric layers 34 or hydrophobic layers 35/35' over the electrodes 31 and/or 31' for driving. Importantly, the characteristic of a low surface tension liquid allows the liquid-film 10 to be disposed within the valve channel 24 as a substantially flat thin disk-shaped.

Referring now to FIGS. 10A, 10B, 11A, 11B, 11C and 11D, in various embodiments the microfluidic valve 1 can be a coverless valve, that is, it can be substantially the same as described herein with regard to FIGS. 2A through 4D, only structured and functional without the cover member 21.

Figure 10A:
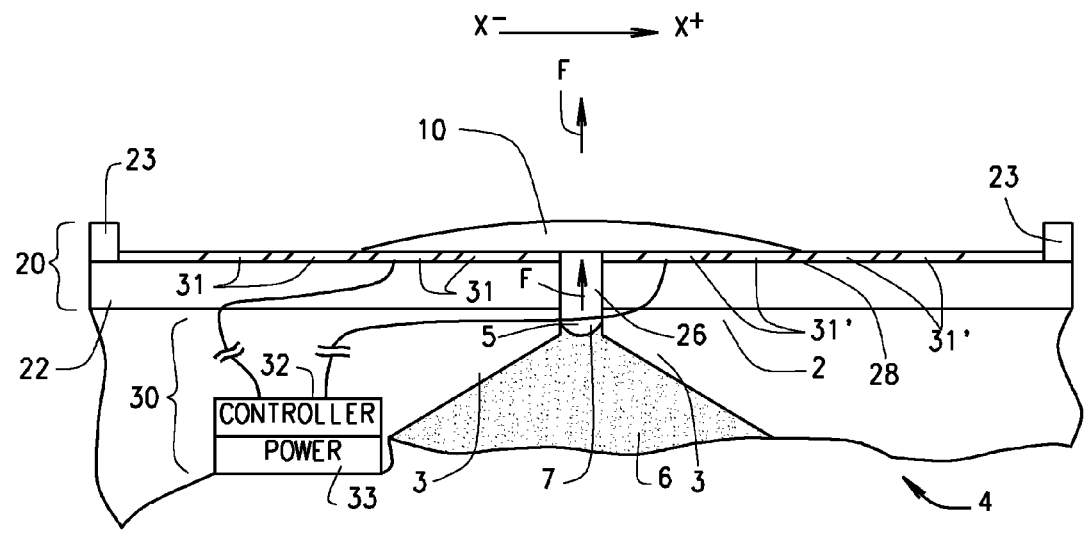
FIG. 10A is a schematic cross-sectional longitudinal side view of a coverless microfluidic valve in a "Closed" state disposed on a tip of a microfluidic system nozzle and exemplarily illustrating a single-side electrode configuration, in accordance with various embodiments of the present disclosure.
Figure 10B:
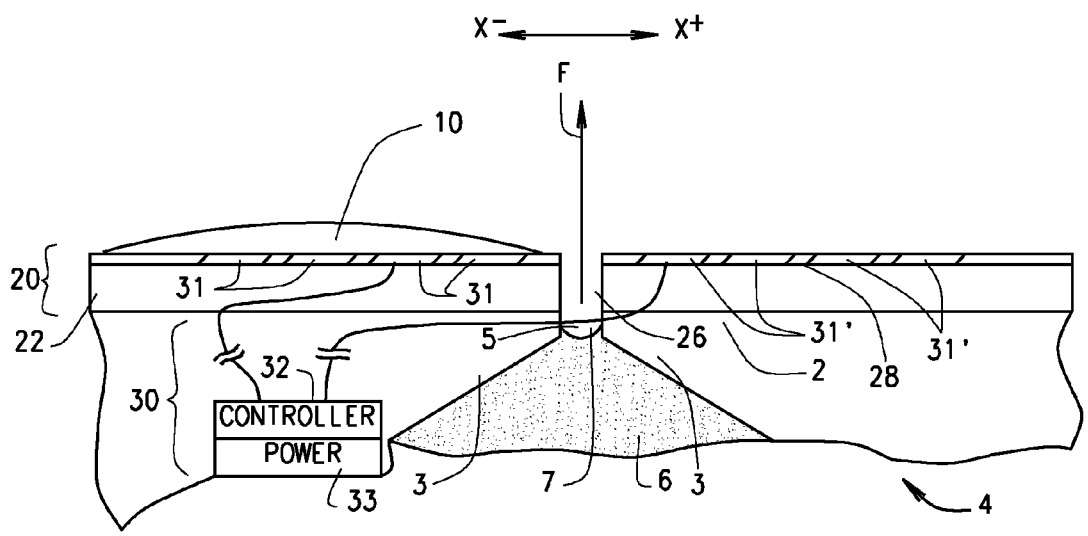
FIG. 10B is a schematic cross-sectional longitudinal side view of the coverless microfluidic valve shown in FIG. 10A in an "Open" state disposed on the tip of the microfluidic system nozzle and exemplarily illustrating a single-side electrode configuration, in accordance with various embodiments of the present disclosure.

As exemplarily illustrated in FIGS. 10A and 10B, in various implementations of such coverless embodiments, the microfluidic valve 1 can be disposed on an outer surface 2 of the fluid dispensing nozzle 3 of the microfluidic system 4. In such implementations, the coverless microfluidic valve 1 includes the liquid-film 10, the valve control subsystem 30, and the base member 22, wherein the top surface 28 of the base member 22 is exposed and open to the external ambient environment. In various implementations, the top surface 28 can have electrodes 31, as described below. As exemplarily illustrated in FIG. 10A in various implementations of such embodiments, the coverless microfluidic valve 1 can further include the interstitial member 23, while in other various implementations, as exemplarily illustrated in FIG. 10B, the coverless microfluidic valve 1 does not include the interstitial member 23.

Alternatively, as exemplarily illustrated in FIGS. 11A, 11B, 11C and 11D, in various implementations of such coverless embodiments, the base member 22 of microfluidic valve 1 can comprise the outer surface 2 of the fluid dispensing nozzle 3 of the microfluidic system 4, herein referred to as base member 2/22. In such implementations, the coverless microfluidic valve 1 includes the liquid-film 10, the valve control subsystem 30 and the base member 2/22, wherein the top surface 28 of the base member 2/22 is exposed and open to the external ambient environment. In various implementations, the top surface 28 can include the dielectric layer and electrodes 34 and 31 and/or the hydrophobic layer 35, as described below. As exemplarily illustrated in FIGS. 11A and 11B in various implementations of such embodiments, the coverless microfluidic valve 1 can further include the interstitial member 23, while in other various implementations, as exemplarily illustrated in FIGS. 11C and 11D, the coverless microfluidic valve 1 does not include the interstitial member 23.

Referring again to FIGS. 10A, 10B, 11A, 11B, 11C and 11D, in the coverless embodiments, the liquid-film 10 is disposed on the top surface 28, is exposed to the external ambient environment, and comprises a low surface tension mini-scale surface crawling thin liquid, such as silicone oil. For example, in the coverless embodiments, the liquid-film 10 can comprise a silicone oil with a surface tension of approximately 20.6 mN/m. Specifically, the characteristics low surface tension the surface crawling liquid-film allow the liquid-film 10 to be disposed on the top surface 28 as a substantially flat thin disk-shaped film having one side of the substantially flat thin disk-shaped liquid-film 10 exposed to the external ambient environment. Additionally, due to the low surface tension characteristics of the selected liquid, the liquid-film 10 retains the form of a substantially flat thin disk-shaped film. Still further, due to the low surface tension of the selected liquid, the liquid-film 10 is structured and operable as a surface crawling film such that the liquid-film 10 is very easily moved between the Open and Closed positions, via the valve control subsystem 30, as described below.

In the coverless embodiments illustrated in FIGS. 10A and 10B, the base member 22 of the microfluidic valve 1 is disposed on the outer surface 2 of the microfluidic system dispensing nozzle 3 such that the base orifice 26 is coaxially aligned with the nozzle orifice 5 and is exposed to the external ambient environment when the liquid-film 10 is in the Open position, as shown in FIG. 10B. Conversely, when in the Closed state or position (sometimes referred to as the "Stand By" state or position), as shown in FIG. 10A, the liquid-film 10 is positioned, via the valve control subsystem 30 on the top surface 28 such that the liquid-film 10 covers the base orifice 26 and blocks a fluid dispensing path, or pathway, F, thereby preventing ambient air from contacting the fluid-air interface 7.

Figure 11A:
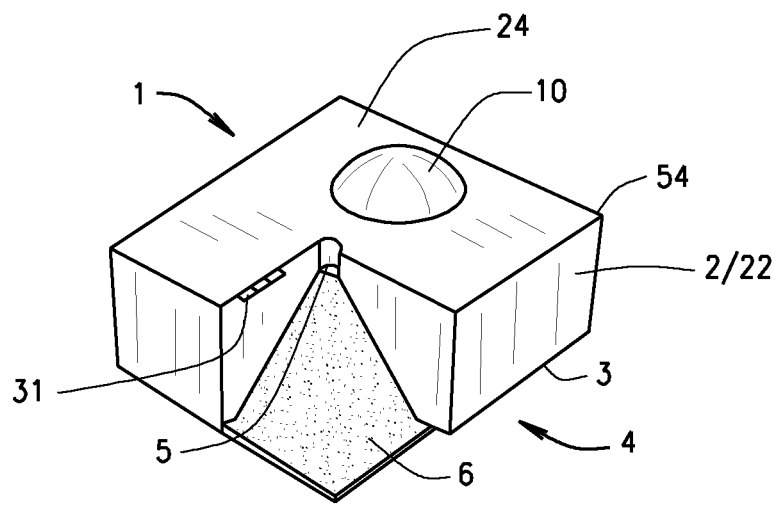
FIG. 11A is a cut-away isometric view of a coverless microfluidic valve, such as that shown in FIG. 10A, in an "Open" state, wherein the microfluidic valve is formed as integral part of a microfluidic system nozzle, in accordance with various embodiments of the present disclosure.
Figure 11B:
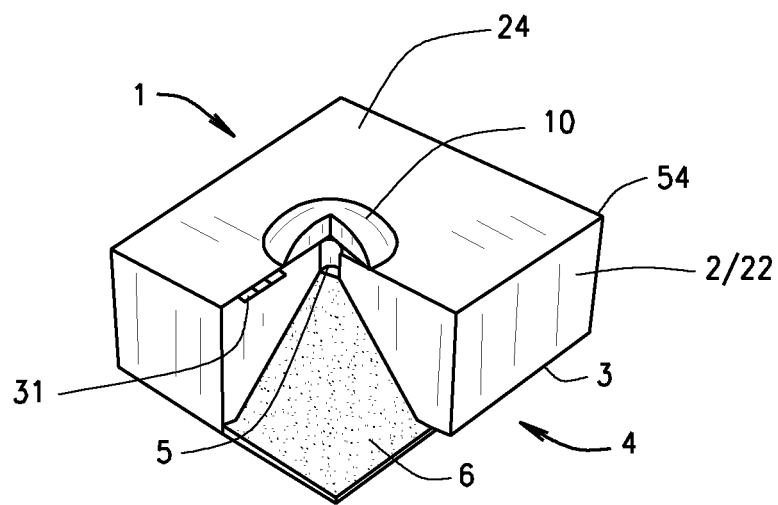
FIG. 11B is a cut-away isometric view of the coverless microfluidic valve shown in FIG. 11A, in a "Closed" state, in accordance with various embodiments of the present disclosure.
Figure 11C:
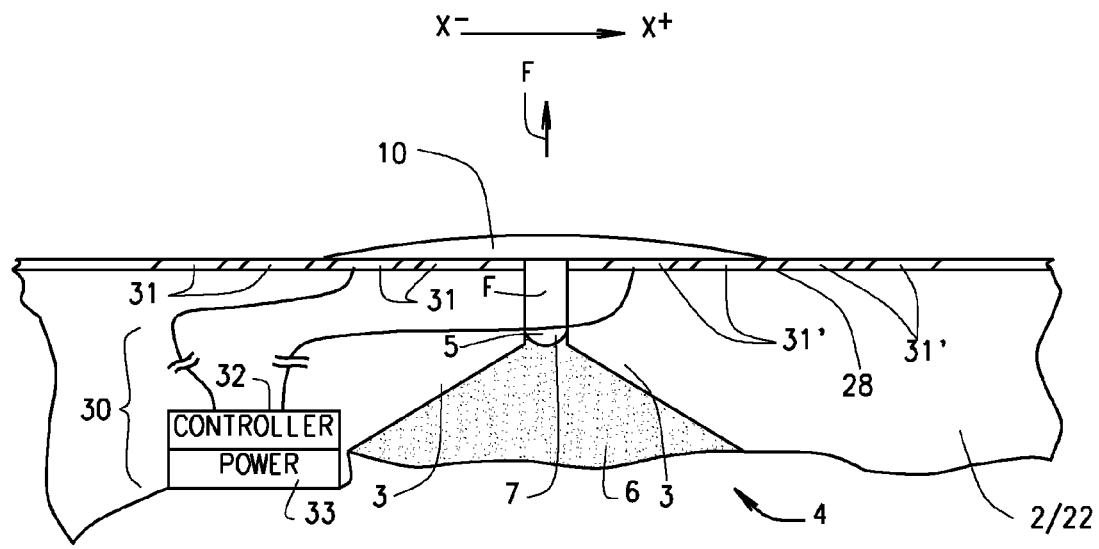
FIG. 11C is a cross-sectional side view of a microfluidic valve, such as that shown in FIG. 10A, in a "Closed" state, wherein the microfluidic valve is formed as integral part of a microfluidic system nozzle, in accordance with various other embodiments of the present disclosure.
Figure 11D:
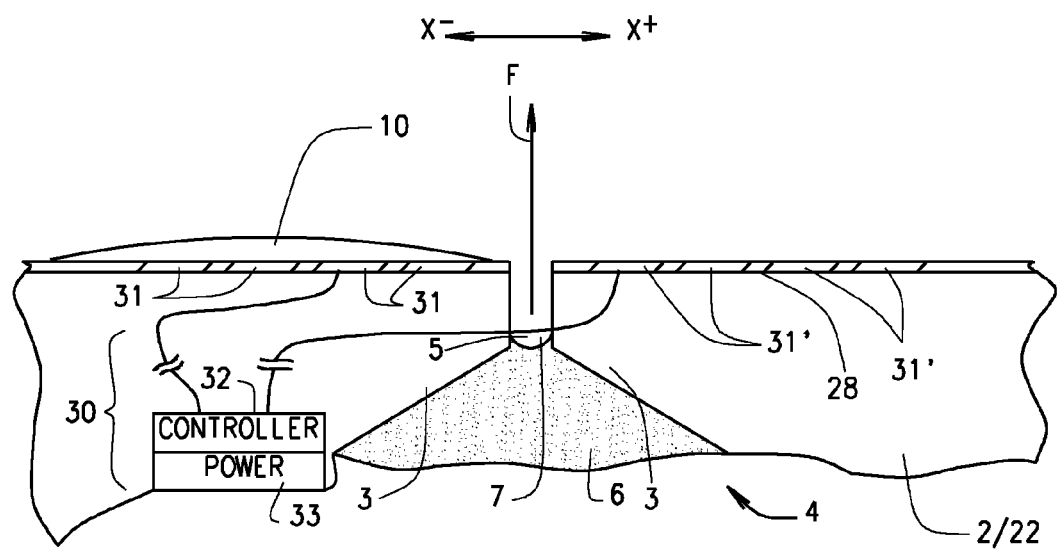
FIG. 11D is a cross-sectional side view of a microfluidic valve shown in FIG. 11C, in an "Open" state, in accordance with various other embodiments of the present disclosure.

In the coverless embodiments illustrated in FIGS. 11A through 11D, the base member 2/22 comprises on the outer surface 2 of the microfluidic system dispensing nozzle 3 such that the nozzle orifice 5 is exposed to the external ambient environment when the liquid-film 10 is in the Open position, as shown in FIGS. 11A and 11D. Conversely, when in the Closed state or position, as shown in FIGS. 11B and 11C, the liquid-film 10 is positioned, via the valve control subsystem 30 on the top surface 28 such that the liquid-film 10 covers the nozzle orifice 5 and blocks a fluid dispensing path, or pathway, F, thereby preventing ambient air from contacting the fluid-air interface 7.

That is, if the fluid dispensing path F is not blocked by the liquid-film 10, i.e., the valve 1 is in the Open position, the fluid-air interface 7 formed at the nozzle orifice 5 will contact ambient air and evaporation of the system fluid 6 will occur continuously. However, when the microfluidic valve 1 is placed in the Closed state, the liquid-film 10 forms a seal over the nozzle orifice 5 and blocks the fluid-air interface 7, thereby preventing, or significantly inhibiting, ambient air from contacting the system-fluid 6 at the fluid-air interface 7. Accordingly, evaporation, or drying out, of the system-fluid 6 retained within the nozzle orifice 5 will be prevented, or significantly retarded, thereby preventing, or significantly retarding, clogging of the nozzle orifice 5.

Conversely, when the microfluidic valve 1 is placed in the Open position to allow the system-fluid 6 to be dispensed from the microfluidic system 4 along the fluid dispensing path F into the external ambient environment (e.g., onto an external surface or substrate) the liquid-film 10 is positioned, via the valve control subsystem 30, such that the fluid air interface 7 is exposed to ambient air.

As described above, in the coverless embodiments the liquid-film 10 is a liquid with a low surface tension such the liquid-film 10 is disposed on the surface 28 and retains the form of a substantially flat thin disk-shaped film (i.e., a dispersed droplet), and further is structured and operable as a surface crawling film easily moved between the Open and Closed positions. Moreover, as also described above, the valve 1 is a microfluidic valve, that is, the valve 1 is a mini-scale valve. Hence, importantly, the size of the liquid-film 10 is also of a mini-scale, or alternatively a micro-scale. Accordingly, due to the mini-scale size and the low surface tension of the liquid-film 10 (e.g., approximately 20.6 mN/M of silicone oil), the low surface energy of the liquid-film 10 dominates such that the liquid-film 10 adheres well to the top surface 28 without the need for the cover member 21. That is, the liquid-film 10 self-adheres to the top surface 28 of the base member 22 (FIGS. 10A and 10B) and the base member 2/22 (FIGS. 11A through 11D). Additionally, the adhesion force of the liquid-film 10 on the surface is dependent on the wettability of the top surface 28. Hence, the mini/micro scale liquid-film 10 will self-adhere to and not fall off or be knocked off the top surface 28 of the base member 22 and the base member 2/22 without the need for the cover member 21, while remaining easily moveable between the Open and Closed position, via the respective valve control subsystem 30.

Referring now to FIGS. 2A through 11D the valve control subsystem 30 can comprise any system structured and operable to dictate the movements of the liquid-film 10 as described herein utilizing electrostatic, magnetic, hydraulic, ultrasonic, piezoelectric, electro-osmostic, thermal, optical, etc. principles.

For example, as illustrated in FIGS. 2A, 2B, 3A and 3B, as an alternative to the dielectric embodiments described above, in various embodiments, the liquid-film 10 can comprise an electrically conductive material and electrowetting principles are employed to control the movement of the liquid-film 10. Or, for example, as illustrated in FIGS. 10A through 11D, the liquid-film 10 comprises an electrically non-conductive liquid-film material and dielectrophoresis principles are employed to control the movement of the liquid-film 10. Accordingly, the valve control subsystem 30 includes one or more of electrodes 31 in electrical and/or magnetic communication with the liquid-film 10. In various implementations, an array of electrodes 31 are deposited in a predetermined pattern on the base member top surface 28. Additionally, the cover member bottom surface 27 for the covered embodiments shown in FIGS. 2A, 2B, 3A and 3B, as exemplarily illustrated in FIG. 2A can include an array of electrodes 31' deposited in a predetermined pattern thereon. It should be understood that, depending on the respective embodiment disclosed herein, the microfluidic valve 1 can include one or more electrodes 31 deposited only on the base member 22 or the base member 2/22, or one or more electrodes 31' deposited only on the cover member 21, or a plurality of electrodes 31 deposited on both the base member 22 or the base member 2/22 and the cover member 21. It is envisioned that in various embodiments, the array of electrodes 31 and/or 31' can be replaced with a single large electrode 31 and/or 31' and remain within the scope of the present disclosure.

Figure 3A:
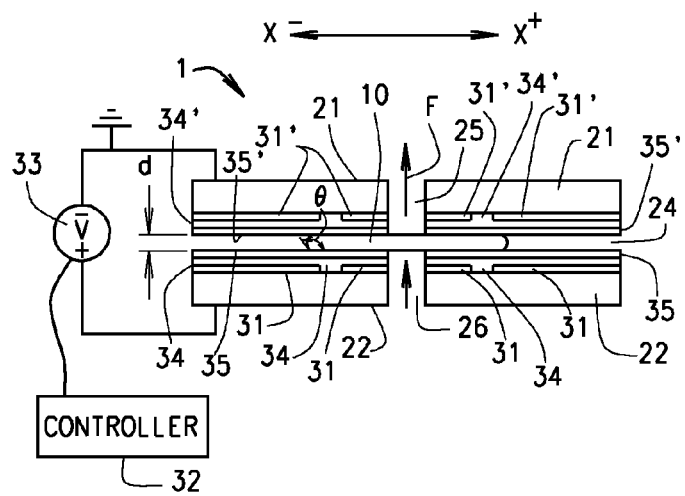
FIG. 3A is a schematic cross-sectional longitudinal side view of the microfluidic valve shown in FIG. 2A, illustrating a contact angle θ of a liquid-film with an outer surface of microfluidic system nozzle, in accordance with various embodiments of the present disclosure.
Figure 3B:
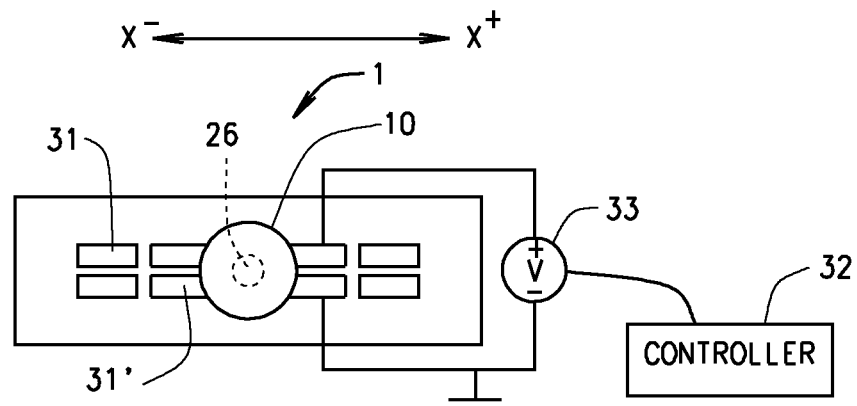
FIG. 3B is a schematic cross-sectional top view of the microfluidic valve shown in FIG. 2B, in accordance with various embodiments of the present disclosure.

For example, FIGS. 2A and 3A illustrate a double-sided configuration wherein a first array of electrodes 31, e.g., an array of anodes, are deposited on the base member top surface 28 and a second array of electrodes 31', e.g., an array of cathodes, are deposited on the cover member bottom surface 27. Or, alternatively, FIGS. 2B and 10A through 11D illustrate a single-sided configuration wherein a first array of electrodes 31, e.g., an array of anodes, are includes in a longitudinal first half of the top surface 28 and a second array of electrodes 31', e.g., an array of cathodes, are included in an opposing longitudinal second half of the top surface 28. More particularly, the electrode(s) 31 are arranged in the patterned array within, or under, a dielectric layer 34 disposed on the base member 22 and base member 2/22. And, the electrode(s) 31' are disposed within a dielectric layer 34' disposed on the cover member bottom surface 27. The dielectric layers 34 and 34' respectively provide electrical insulation about the electrodes 31 and 31'. Furthermore, in various embodiments (as exemplarily shown in FIGS. 2A, 2B and 3A), the microfluidic valve 1 can include a hydrophobic coating layer 35 disposed over the dielectric layer 34 of the and/or a hydrophobic coating layer 35' disposed over the dielectric layer 34' of the cover member 21. The hydrophobic coating layers 35 and 35' provide contact surfaces for the liquid-film film 10 that will not absorb or diminish the volume of the liquid-film 10 such that movement of the liquid-film 10 is predictable and consistently controllable.

In such embodiments, the valve control subsystem 30 further includes a controller 32 and a power source 33. The controller 32 can be any device operable to control the movement of the liquid-film 10. For example, in various implementations the controller 32 can be a microprocessor or an application specific integrated circuit (ASIC). The power source 33 can be any device cooperative with the controller 32 to provide power for controllably energizing the electrode(s) 31 and 31' in order to govern movement of the liquid-film 10. For example, in various implementations the power source can be a direct current (DC) supply or an alternating current (AC) supply.

The controller 32 includes appropriate programming to employ electrowetting principles and/or dielectrophoresis principles such that execution of such programming controls voltages between the electrodes 31 and 31' to selectably control movement of the liquid-film 10 in the $X^+$ and $X^-$ directions, hereafter referred to as longitudinal movement. Particularly, based on the respective electrowetting or dielectrophoresis principles, the liquid-film 10 can be quickly and precisely positioned over the base member orifice 26 or nozzle orifice 5, i.e., positioned in the Closed position, to cover the fluid-air interface 7, via electrostatic attraction forces generated by application of electric fields from the power source 33 to selected electrodes 31 and 31', as controlled by the controller 32. Similarly, the liquid-film 10 can be quickly and precisely pulled away from the base member orifice 26 or nozzle orifice 5 and moved to the adjacent position, i.e., to the Open position, to allow the system-fluid to flow along the fluid dispensing path F, via electrostatic attraction forces generated by application of electric fields from the power source 33 to other selected electrodes 31 and 31', as controlled by the controller 32. The movement of the liquid-film 10 between the Open and Closed positions, as controlled by the controller 32, can be respectively synchronized with system-fluid dispensing and non-dispensing operations of the microfluidic system 4.

More specifically, in the electrowetting embodiments, when an electrical potential is applied between electrodes 31 and 31' and across the liquid-film 10, improved wetting is exhibited in the liquid-film 10 due to a reduction in a contact angle θ (shown in FIG. 3A) between the liquid-film 10 and the dielectric layer 34, and in the various embodiments wherein the valve 1 includes the cover member 21, the dielectric layer 34'. Or, in various embodiments, improved wetting is exhibited in the liquid-film 10 due to a reduction in the contact angle θ between the liquid-film 10 and the hydrophobic coating layer 35, and in the various embodiments wherein the valve 1 includes the cover member 21, the hydrophobic coating layer 35'. This results from the lowering of solid-liquid interfacial energy through electrostatic energy stored in a capacitor formed by the liquid-film 10, the dielectric layers 34 and 34' and the electrodes 31 and 31'. The dependence of the effective solid-liquid interfacial tension, $\gamma_{SL}$, on the applied voltage, V, is given according to the equation:

$$\gamma_{sl} = \gamma_{sl}^0 - \frac{\varepsilon V^2}{2d};$$

where $\gamma^0{}_{sl}$ is the interfacial tension at zero applied potential, and $\in$, and d are the dielectric constant and thickness of the dielectric layer 34 and 34', respectively. In accordance with electrowetting principles, the effect of a Debye layer in the liquid, i.e., the liquid-film 10, is negligible since its capacitance is connected in series with the solid insulator, i.e., the dielectric layer 34 and 34', which typically has a much smaller capacitance.

The electrowetting effect is relatively independent of the concentration or type of ions in the liquid-film 10. In addition, it is desirable to use a solid dielectric material for the dielectric layer 34 and 34' to provide larger surface energies at lower electric fields, which provides greater controllability over the surface chemistry. Since the dielectric layer 34 and 34' play the role of the insulator, both ohmic heating and undesired electrolysis are prevented. With this basic actuation theory, various electrode patterns and layouts can be designed to achieve desired manipulation of the liquid-film 10.

Additionally, according to the Lippmann-Young equation, the relation between applied voltage V and the contact angle θ can be derived as:

$$\cos\theta - \left(\frac{\gamma_{gs} - \gamma_{sl}}{\gamma_{lg}} + \frac{\varepsilon_s V^2}{2\gamma_{lg}h}\right) = 0;$$

where $\varepsilon_s$, $\gamma_{ls}$, $\gamma_{gs}$, $\gamma_{lg}$, h, θ are the dielectric constant of the dielectric layers 34 and 34', liquid-solid, gas-solid, and liquid-gas interfacial tension coefficients, h is the thickness of the dielectric layer 34 and 34' and θ is the contact angle at the triple phase, respectively.

Figure 4A:
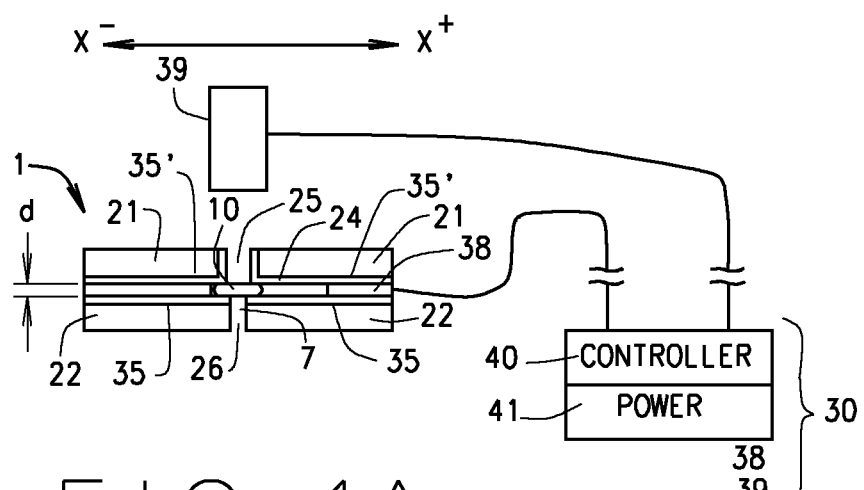
FIG. 4A is a schematic cross-sectional longitudinal side view of a microfluidic valve, such at that shown in FIG. 2A, in a "Closed" state and structured to operate utilizing electromagnetic forces, in accordance with various embodiments of the present disclosure.
Figure 4B:
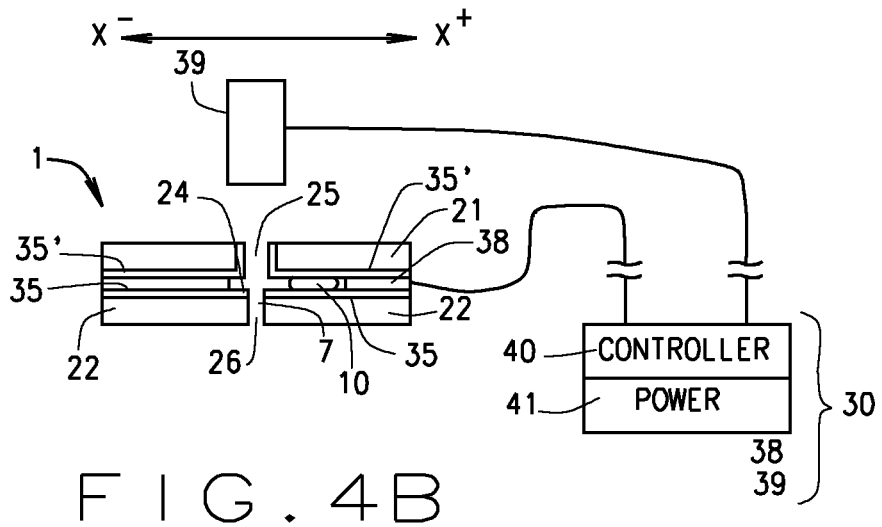
FIG. 4B is a schematic cross-sectional longitudinal side view of the microfluidic valve shown in FIG. 4A, in an "Open" state, in accordance with various embodiments of the present disclosure.
Figure 4C:
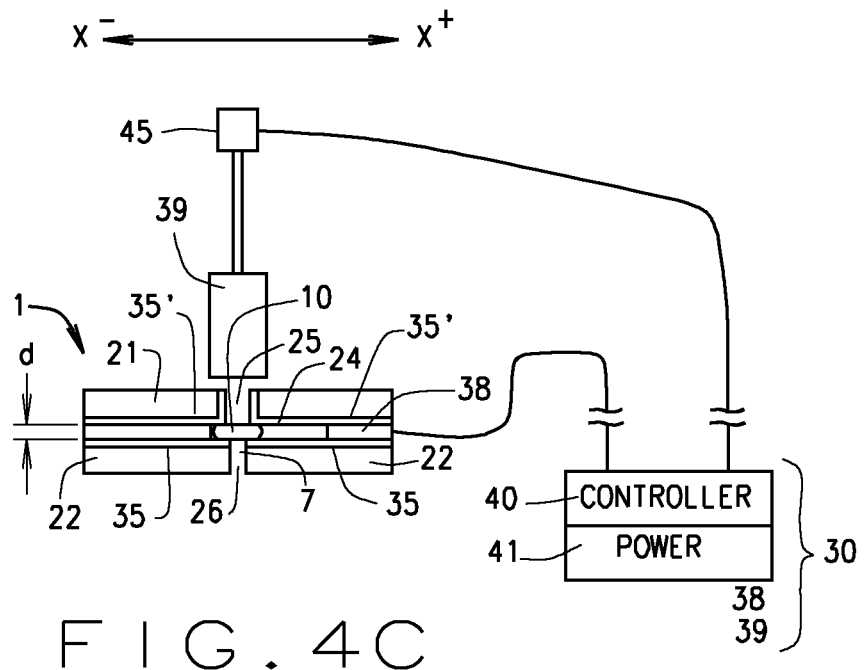
FIG. 4C is a schematic cross-sectional longitudinal side view of a microfluidic valve, such at that shown in FIG. 2A, in a "Closed" state and structured to operate utilizing permanent magnets, in accordance with various embodiments of the present disclosure.

Referring now to FIGS. 4A, 4B, 4C and 4B, in various embodiments, the liquid-film 10 comprises a ferrofluid and positioning of the liquid-film 10 is control by selectably controlled exertion of magnetic forces on the ferrofluid liquid-film 10. In such embodiments, the valve control subsystem 30 includes an internal magnet 38 disposed within the valve channel 24 and at one end of the valve channel 24, and an exterior magnet 39 positioned outside of the valve channel 24 (adjacent the cover member orifice 25 in the various embodiments including cover member 21). Ferrofluids are magnetic fluids created by suspending ferromagnetic particles in a carrier fluid. Carrier fluids can be water, diesters, hydrocarbons or fluorocarbons and have a range of physical properties to serve many different applications. The properties of ferrofluids allow the liquid-film 10 to conform to the shape of the valve channel 24 to provide very good seals.

According to the electromagnetic field theory, the magnetic force experienced by a single paramagnetic particle in a magnetic field can be stated as:

$$F_{mag} = -m \cdot B;$$

where B is the applied magnetic flux density, m is the magnetic moment of the magnetic particle. This equation can be rewritten as:

$$F_{mag} = \nabla(m \cdot B) = (m \cdot \nabla)B + (B \cdot \nabla)m$$

When B is large enough to saturate m, the equation reduces to:

$$F_{mag} \approx (m \cdot \nabla)B = V\chi_m(H \cdot \nabla)B$$

Referring particularly to FIGS. 4A and 4B, in various implementations, the internal and external magnets can be microfabricated electromagnets, and the valve control subsystem 30 can include a controller 40 and a power source 41. The controller 40 can be any device operable to control operation of the internal and external magnets 38 and 39 in order to control the movement of the liquid-film 10 within the valve channel 24. For example, in various implementations the controller 40 can be a microprocessor or an application specific integrated circuit (ASIC). The power source 41 can be any device cooperative with the controller 40 to provide power for controllably energizing the internal and external magnets 38 and 39 in order to govern movement of the liquid-film 10 within the valve channel 24.

Accordingly, in such implementations, the internal magnet 38 can be operated to exert an attractive force on the liquid-film 10, via control of the power source 41 by the controller 40. The generated attractive force pulls the ferrofluid liquid-film 10 toward the internal magnet 38 within the valve channel, thereby exposing the base member orifice 26, so that the system-fluid 6 can be dispensed, as shown in FIG. 4B. Subsequently, after a desired amount of system-fluid 6 had been dispensed, the controller 40 controls the power source 41 such that the internal magnet 38 stops exerting an attractive force on the liquid-film 10. Substantially simultaneously, the external magnet 39 is operated to exert an attractive force on the liquid-film 10, via control of the power source 41 by the controller 40. The attractive force generated by the external magnet 39 pulls the ferrofluid liquid-film 10 back toward the base member orifice 26, thereby covering and sealing the base member orifice 26, and more particularly the fluid-air interface 7 such that ambient air will not contact the system-fluid 6 retained within the base member orifice 26.

Figure 4D:
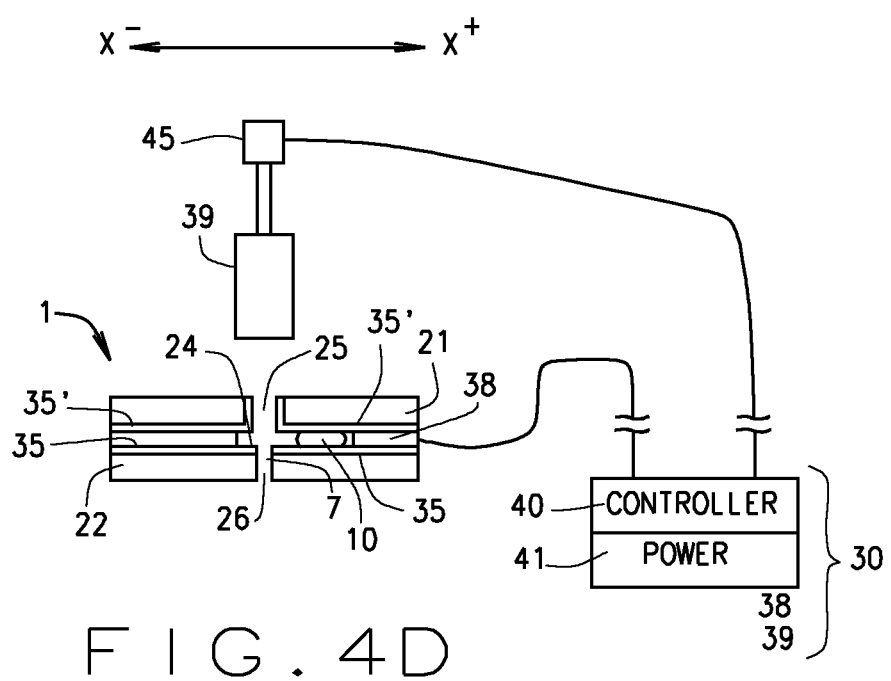
FIG. 4D is a schematic cross-sectional longitudinal side view of the microfluidic valve shown in FIG. 4C, in an "Open" state, in accordance with various embodiments of the present disclosure.

Referring particularly to FIGS. 4C and 4D, alternatively, in various other implementations, the internal and external magnets 38 and 39 can be permanent magnets. In such implementations, the external magnet 39 is connected to an actuator 45 that is controlled by the controller 40 to selectively move the external magnet towards and away from the cover member orifice 25.

Accordingly, in such implementations, to place the liquid-film 10 in the Open position, the external magnet 39 can be moved away from the cover member orifice 25, via the actuator 45 as powered by the power source 41 and controlled by the controller 40. Thereafter, the attractive force exerted on the ferrofluid liquid-film 10 by the internal magnet 38 will pull the liquid-film 10 toward the internal magnet 38 within the valve channel 24, thereby exposing the base member orifice 26, so that the system-fluid 6 can be dispensed, as shown in FIG. 4D. Subsequently, after a desired amount of system-fluid 6 had been dispensed, to move the liquid-film to the Closed position, the external magnet 39 can be moved toward and in close proximity to the cover member orifice 25, via the actuator 45 as powered by the power source 41 and controlled by the controller 40. As the external magnet is moved into close proximity of the cover member orifice 25, the attractive force exerted on the ferrofluid liquid-film 10 by the external magnet 39 will overcome the attractive force exerted on the ferrofluid liquid-film 10 by the internal magnet 38. Hence, the ferrofluid liquid-film 10 will be pulled back to the Closed position, as shown in FIG. 4C. When in the Closed position, the liquid-film 10 covers and seals the base member orifice 26, and more particularly covers and seals the fluid-air interface 7 such that ambient air will not contact the system-fluid 6 retained within the base member orifice 26. In such embodiments, the magnetic forces generated by the external magnet 39 are greater than the magnet forces generated by the internal magnet 38 in order to overcome the force exerted by the internal magnet 38 on the ferrofluid liquid-film 10.

Referring again to FIGS. 4A, 4B, 4C and 4D, the magnetically implemented movement of the liquid-film 10 between the Open and Closed positions, as controlled by the controller 40, can be respectively synchronized with system-fluid dispensing and non-dispensing operations of the microfluidic system 4.

Additionally, in various implementations, the microfluidic valve 1 can include hydrophobic coating layer 35 and 35', substantially similar to hydrophobic coating layers 35 and 35' described above, disposed over the inner surfaces of the base and cover member 22 and 21. As described above, the hydrophobic coating layer(s) provide contact surfaces for the liquid-film 10 within the valve channel 24 that will not absorb or diminish the volume of the liquid-film 10 such that movement of the liquid-film 10 within the valve channel 24 is predictable and consistently controllable.

Referring now to FIGS. 2A through 4D and 10A through 11D, it is envisioned that the base member 22 (and the cover member 21 in the various embodiments including cover member 21) can be fabricated of any material that is non-reactive with the system-fluid 6 and the liquid-film 10. Additionally, the distance d between the dielectric layer 34 and 34' (in the various embodiments including cover member 21) or between the hydrophobic layer 35 and 35' (in the various embodiments including cover member 21) is pre-determined for a particular application. In various embodiments, the diameter of the base member orifice 26 can be substantially equal to the diameter of the system nozzle orifice 5. Additionally, in the various embodiments including cover member 21, the diameter of the cover member orifice 25 can be slightly larger that the diameter of the base member orifice 26 to avoid the obstruction to the fluid dispensing path F.

Referring now to FIGS. 5A and 5B, in various embodiments wherein in the valve 1 includes the cover member 21, the cover member bottom surface 27 can be structured to enhance the stability of the liquid-film 10 within the valve channel 24. Particularly, the cover member bottom surface 27 can include one or more longitudinal stabilizing grooves 42 into which the liquid-film 10 will protrude, or conform. Accordingly, as the liquid-film 10 is moved longitudinally along the valve channel 24 between the Closed and Open positions, the longitudinal stabilizing groove(s) 42 serve(s) as stabilizing tracks that deter lateral movement of the liquid-film 10 within the valve channel 24.

Referring now to FIG. 5C, in various embodiments wherein in the valve 1 includes the cover member 21, the cover member bottom surface 27 can be structured to enhance the stability of the liquid-film 10 in the Closed position, i.e., at the base member orifice 26. Particularly, the cover member bottom surface 27 can include a stabilizing recess 43 centered at the cover member orifice 25 into which the liquid-film 10 will protrude, or conform when placed in the Closed position. Accordingly, the stabilizing recess 43 serves to stabilize the liquid-film 10 in the Closed position to provide a more stable seal at the base member orifice 26.

Additionally, it is envisioned that the lateral cross-section of the valve channel 24, i.e., a cross-section orthogonal to the longitudinal movement of the liquid-film within the valve channel 24 as described above, can have any suitable shape. For example, in various embodiments, the valve channel 24 can have a substantially rectangular lateral cross-section, as shown in FIGS. 5A, 5B and 5C. Or, in various other embodiments, the valve channel 24 can have a triangular lateral cross-section, or an oval lateral cross-section, or any other lateral cross-section suitable to confine the liquid-film 10 to longitudinal movement between the Closed and Open positions, as described above. It is also envisioned that locally different surfaces (i.e., a combination of hydrophobic and hydrophilic surfaces) can be employed to enhance the stability of the liquid-film 10 within the valve channel 24.

Referring now to FIGS. 6A, 6A, 7A, 7B, 11A and 11B, in various embodiments, the interstitial member 23 can be structured to provide the valve channel 24 such that the valve channel 24 includes a holding chamber 50 connected to an elongated guiding duct 51. The base member orifice 26 or the nozzle orifice 5, depending on the respective embodiment, is centrally located within the holding chamber 50. If movement of the fluid-film-core 10 is controlled via electrowetting or dielectrophoresis principles, as described above, the electrodes are deposited on the base member 22 or 2/22 top surface 28, and/or the cover member inners surface 27. The holding chamber 50 is structured to provide position stability for the fluid-film-core 10 to substantially center the fluid-film-core 10 over the base member orifice 26 or nozzle orifice 5 when in the Closed position. The elongated guiding duct 51 is structured to provide lateral stability of the fluid-film-core 10 as the fluid-film-core 10 is moved to and from the Open position.

FIGS. 2A through 6B, 10A and 10B illustrate the microfluidic valve 1 as being independent from the microfluidic system 4, wherein that the microfluidic valve 1 is structured to be disposed on, e.g., attached to, the microfluidic system nozzle 3.

However, as illustrated in FIGS. 7A, 7B, 7C, 7D, 11A, 11B, 11C and 11D, in various embodiments, the microfluidic valve 1 can be formed as an integral part of the microfluidic system nozzle 3.

For example, as illustrated in FIGS. 7A, 7B, 11A and 11B in various embodiments, the base member 22 is not present and the interstitial member 23 is disposed directly on a distal surface 54 of the microfluidic system nozzle outer surface 2. Therefore, in such embodiments, the microfluidic system nozzle outer surface 2 provides the base member 22 and the distal surface 54 of the microfluidic system nozzle outer surface 2 provides the base member top surface 28. Moreover, electrodes and a dielectric layer and/or a hydrophobic coating layer can be disposed on the microfluidic system nozzle distal surface 54 in the same manner the electrodes 31, dielectric layer 34 and/or hydrophobic coating layer 35 is/are disposed on the base member top surface 28, as described above. In such embodiments, the interstitial member 23 (and cover member 21 in the various embodiments including cover member 21) can be structured and operable in substantially the same manner as described above with regard to FIGS. 2A through 6B. Accordingly, the integrally formed microfluidic valve 1 shown in FIGS. 7A, 7B, 11A and 11B can be structured to function in substantially the same manner as described above with regard to FIGS. 2A through 6B.

Figure 7A:
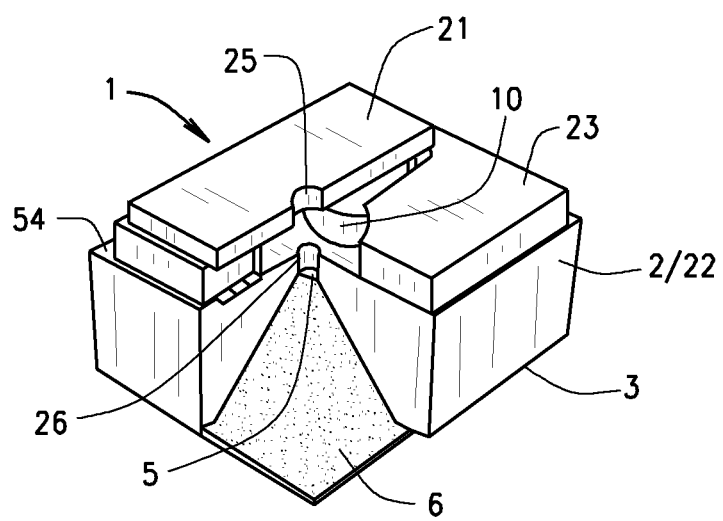
FIG. 7A is a cut-away isometric view of a microfluidic valve, such as that shown in FIG. 6B, in an "Open" state, wherein the microfluidic valve is formed as integral part of a microfluidic system nozzle, in accordance with various embodiments of the present disclosure.
Figure 7B:
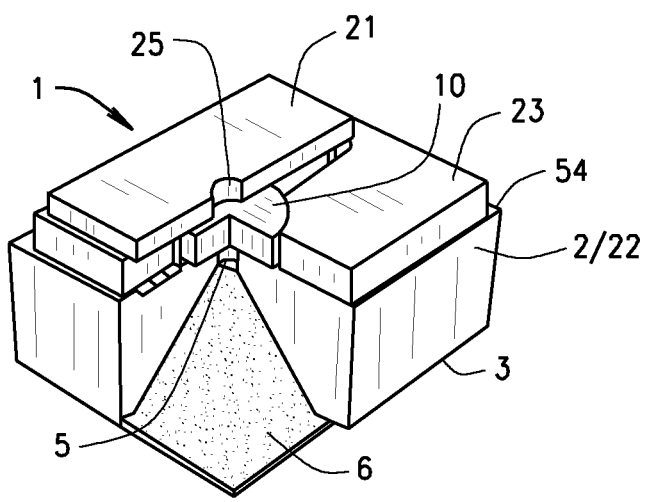
FIG. 7B is a cut-away isometric view of the microfluidic valve shown in FIG. 6A, in a "Closed" state, in accordance with various embodiments of the present disclosure.
Figure 7C:
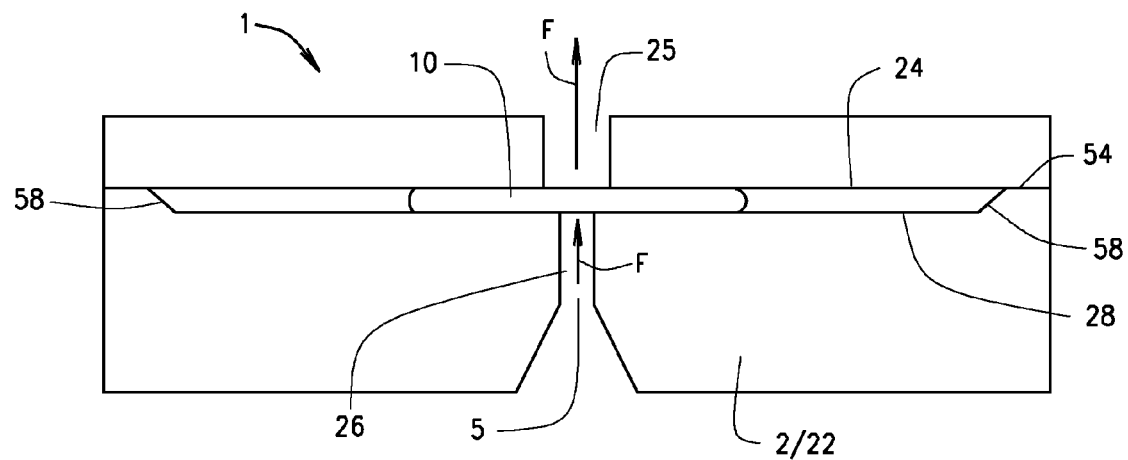
FIG. 7C is a cross-sectional side view of a microfluidic valve, such as that shown in FIG. 2A, in a "Closed" state, wherein the microfluidic valve is formed as integral part of a microfluidic system nozzle, in accordance with various other embodiments of the present disclosure.
Figure 7D:
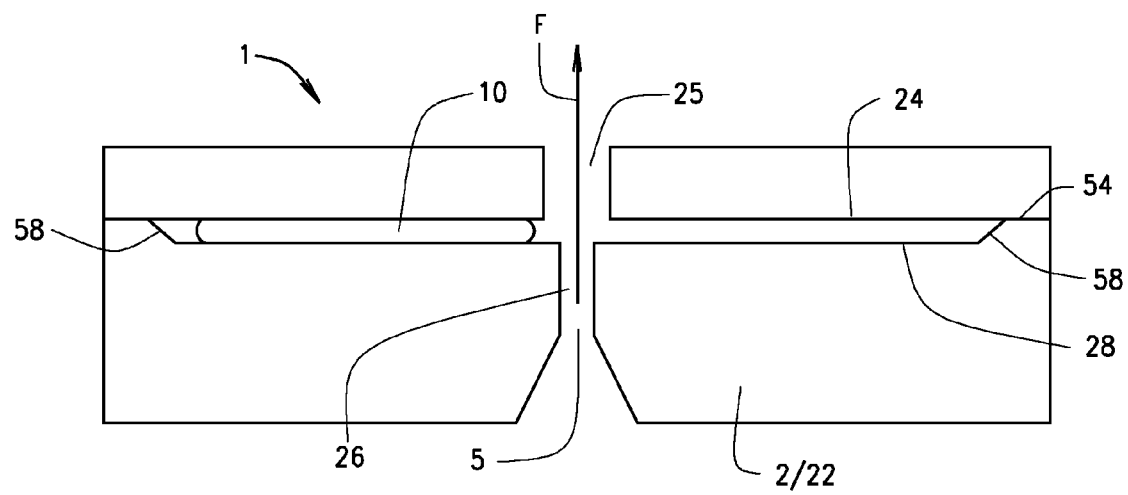
FIG. 7D is a cross-sectional side view of the microfluidic valve shown in FIG. 7C, in an "Open" state, in accordance with various other embodiments of the present disclosure.

Alternatively, as illustrated in FIGS. 7C, 7D, 11C and 11D, in various embodiments, the base member 22 and the interstitial member 23 are not present. In FIGS. 7C and 7D the cover member 21 is disposed directly on the distal surface 54 of the microfluidic system nozzle outer surface 2 and the microfluidic system nozzle outer surface 2 can be recessed to form the valve channel 24. In FIGS. 11C and 11D the valve 1 does not include the cover member 21. and the nozzle outer surface 2 is substantially flat such that the liquid-film 10 will crawl along the flat top surface between the Open and Closed positions without the need for the channel 24. In all such embodiments, the microfluidic system nozzle outer surface 2 provides the base member top surface 28.

Accordingly, electrodes and a dielectric layer and/or hydrophobic coating layer can be disposed on the top surface 28 in the same manner as the electrodes 31 and dielectric layer 34 and/or the hydrophobic coating layer 35 is/are disposed on the base member top surface 28, as described above. Furthermore, in the various embodiments wherein in the valve 1 includes the cover member 21, the cover member 21 can be structured and operable in substantially the same manner as described above with regard to FIGS. 2A through 6B. Accordingly, the integrally formed microfluidic valve 1 shown in FIGS. 7A through 7D and 11A through 11D, wherein the outer surface 2 of microfluidic system nozzle 3 forms the base member 2/22, can be structured to function in substantially the same manner as described above with regard to FIGS. 2A through 6B, 10A and 10B.

Figure 8:
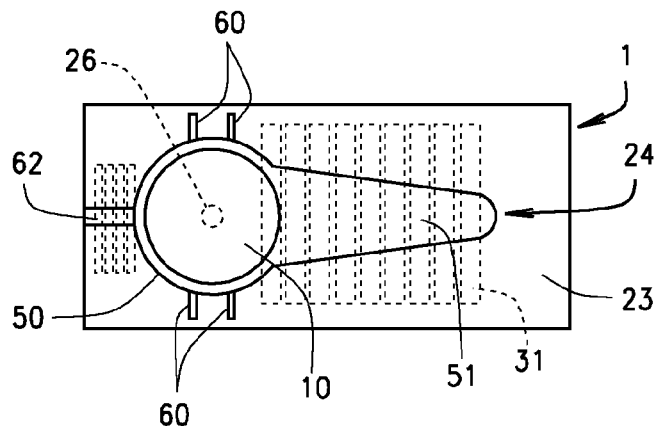
FIG. 8 is a schematic cross-sectional top view of a microfluidic valve, such as that shown in FIG. 6A, including one or more position and size sensors and a refilling port, in accordance with various embodiments of the present disclosure.

Referring now to FIG. 8, in various embodiments, the microfluidic valve 1 can further include one or more sensors, or a sensing array, 60 to monitor the size, position and/or movements of the liquid-film 10. In such embodiments, the sensor(s) 60 is/are disposed in the valve channel 24, or on the top surface 28, laterally adjacent the base member orifice 26 or the nozzle orifice 5 such that the sensor(s) 60 can detect when the fluid-film-core 10 is properly located over the base member orifice 26 or the nozzle orifice 5, when in the Closed position, and when the fluid-film-core 10 is properly located away from the base member orifice 26 or nozzle orifice 5, when in the Open position. Additionally, the sensors can be operable to sense any diminution in the size of the fluid-film-core 10, which could lead to functional inefficiency of the microfluidic valve 1. The sensor(s) 60 can comprise and suitable sensor such as capacitive or resistive sensors.

Additionally, in various embodiments, the microfluidic valve 1 can further include a refilling port 62 structured and operable to allow liquid-film material to be added to the liquid-film 10. For example, if the sensors 60 detect that the liquid-film 10 has decreased in volume/size, additional liquid-film material can be introduced into the valve channel 24, via the refilling port 62. Accordingly, the additional liquid-film material will combine with the liquid-film 10 and increase the volume/size of the liquid-film 10 such that a substantially constant volume of the liquid-film 10 can be maintained.

Figure 9A:
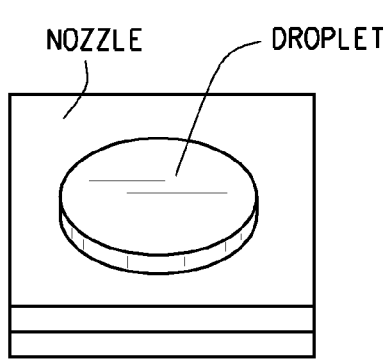
FIGS. 9A, 9B and 9C are illustrations of pictures of a test setup for testing the feasibility of the various embodiments of the microfluidic valve shown in FIGS. 2A through 8.
Figure 9B:
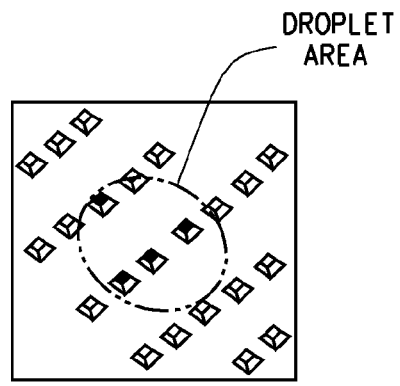
Figure 9C:
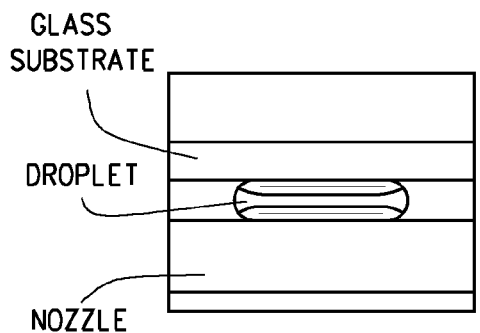
Figure 9D:
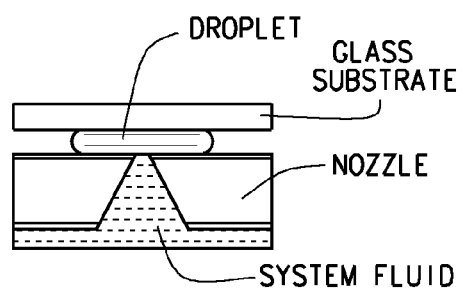
FIG. 9D is an exemplary schematic diagram of the testing setup shown in FIGS. 9A, 9B and 9C.

Referring now to FIGS. 9A, 9B, 9C and 9D, evaluation of the feasibility of the microfluidic valve 1, as described above, will now be described. The stability of the liquid-film 10 was tested by placing a liquid droplet on top of a plurality of orifices of a microfluidic system nozzle, e.g., a print head nozzle, and sandwiching the droplet with a top glass substrate. FIG. 9D is an exemplary schematic diagram of the testing setup, with the liquid droplet sandwiched between the top surface of a nozzle and the inner surface of a cover glass. As illustrated, the liquid droplet covers a nozzle orifice (only a single orifice is illustrated in FIG. 9D), which is holding the microfluidic system-fluid, e.g., printer ink.

In the particular study, a drop of mercury (a liquid metal) was placed on top of an array of small orifices, each having a diameter of about 100 microns, and the gap distance between the top surface of the nozzle and the inner surface of the cover glass was about 300 microns. FIGS. 9A, 9B and 9C are illustrations of pictures of testing setup with a liquid droplet on top of an orifice array. Particularly, FIG. 9A is the top view, FIG. 9B the bottom view with a circle indicating the droplet area, and FIG. 9C the side view. As shown in FIG. 9A, the mercury droplet spreads and turns into a circular thin disk liquid film having approximately a 4 mm diameter. As shown in FIGS. 9B and 9C, the mercury film covers over the orifice area completely, while importantly the liquid film is stable. That is, the mercury film retains its circular disk shape and does not lose volume by dropping down into the nozzle orifices.

Testing also considered the bulge-up effect of a liquid droplet, i.e., a liquid-film such as liquid-film 10, sandwiched between the two substrates with openings, and found that by controlling the gap distance between the two substrates with openings, with respect to the radius of the orifices, the surface tensions, the contact angle of the liquid-film and the surface composition of the nozzle, bulging up of the liquid-film can be prevented or adjusted.

Particularly, a simple bulge-up test at an opening in a glass substrate was done. A glass with 1 mm diameter hole was place on top of a mercury drop disposed on a base substrate, and the gap distance between glass and base substrates was set at about 300 microns. The gap distance was then systematically reduces and as the gap distance is reduced, the liquid metal in the opening was bulged up more and more and when the gap distance was smaller than a certain threshold level, liquid drop escaped out of the hole in the glass substrate.

The bulging at the orifice area is caused by the pressure imbalance within a liquid drop in accordance with the nozzle, orifice and gap geometries, which is given by the following equation:

$$\Delta P = P_{ch} - P_{noz} \geq \gamma_{LG}\left(-\frac{2\cos\theta_c}{d} + \frac{1}{R_{liq}} - \frac{4}{D}\right);$$

where $P_{ch}$, $P_{noz}$, $\gamma_{LG}$, $\theta_c$, $R_{liq}$, d, are the pressure inside of liquid in the gap and the pressure at the nozzle, the surface tension at the interface of liquid and solid, the contact angle, the radius of the liquid droplet, and the gap distance respectively, and D represents the radius of the nozzle orifice. According to the expression, when d<<D, $P_{ch}$ gets bigger than $P_{noz}$. Thus, the liquid tends to bulge out through the orifice. When the gap size gets close to the orifice radius or the radius of the orifice in the cover changes, the pressure inside the liquid film in the gap ($P_{ch}$) drops lower than the pressure at the nozzle side ($P_{noz}$). It also indicates that contact angle and surface tension also affect the pressure relationship. This result gives very important information for the successful valve design.

Experimentation also compared the evaporation speeds of a system-fluid in the orifice before and after ejection by covering the orifice with a liquid-film, and found that the evaporation speed decreases significantly after covering. The experiments tested the evaporation speeds of water (a common solvent in an inkjet printer fluid) retained within a microfluidic system chamber before and after closing an orifice to the chamber with mercury droplet. Without the blocking of the orifice, water in the chamber evaporated completely in approximately 5 min. However, with a closed orifice, volume reduction of the water was not noticed even after a few hours (e.g., 6 hours).

Hence the present disclosure provides a microfluidic valve that incorporates a liquid-film to control the opening and closing of a fluid-air interface of an ejection nozzle orifice of a microfluidic system. Closing the nozzle orifice using the liquid-film prevents prolonged air exposure of system-fluid retained within the orifice, and thereby substantially eliminates drying out/evaporation of the system-fluid and clogging of the orifice. The disclosed microfluidic valve also prevents stiction problems commonly encountered with conventional solid microstructure-based valve system.

Figure 12:
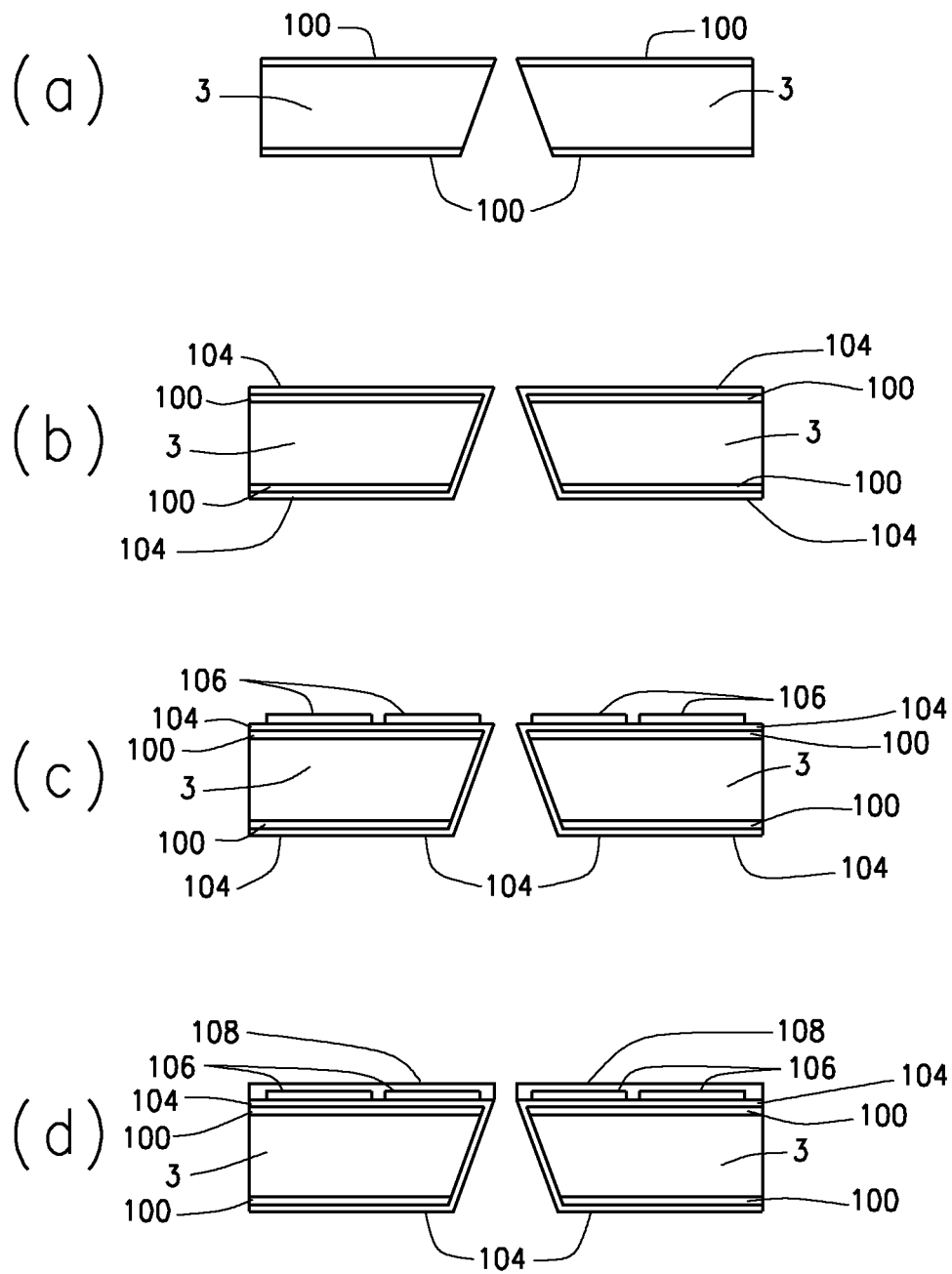
FIG. 12 is an illustration of an exemplary fabrication process of the microfluidic valve shown in FIGS. 2A and 2B, in accordance with various embodiments of the present disclosure.
Figure 12:
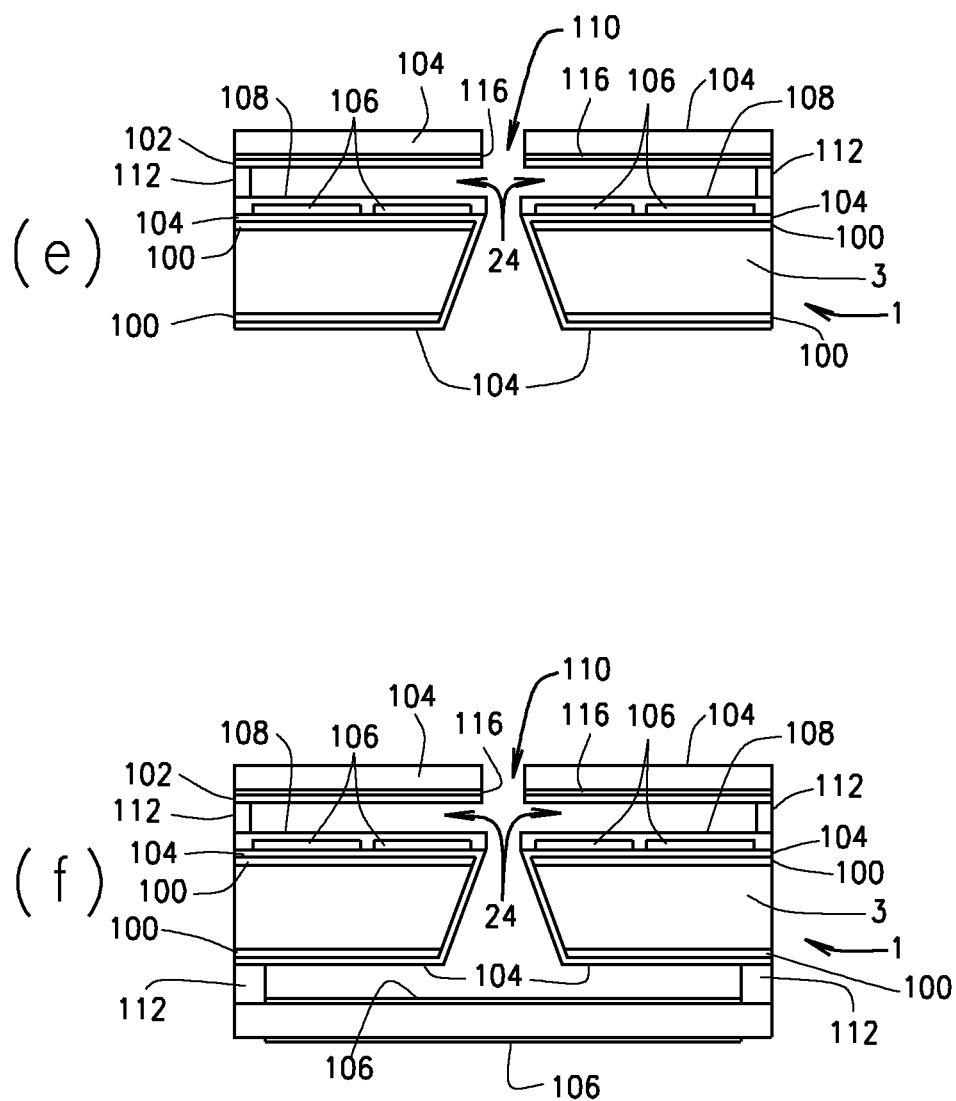

FIG. 12 illustrates an exemplary fabrication process of the microfluidic valve 1, such as the microfluidic valve exemplarily illustrated in FIGS. 2A and 2B. In reference to the fabrication steps (a) through (f) of FIG. 12, the reference number 100 indicates silicon nitride, 102 indicates silicon, 104 indicates parylene, 106 indicates DEP electrodes, 108 indicates hydrophobic coating, 112 indicates an SU-8 spacer, 116 indicates ITO coating, and 120 indicates PZT ceramic. In step (a) an ejector nozzle, such as nozzle 3, (e.g., approx. 50 μm in diameter) is formed by an anisotropic silicon etchant (KOH) and cleaned by an ultrasonic agitations. Steps (b) through (e) depict the fabrication of the microfluidic valve 1 onto the surface of the ejector nozzle, e.g., nozzle 3. During steps (b) through (e), the top surface of the ejector nozzle is first coated with a parylene layer 104 (e.g., approx. 5 μm thick) after being treated with an adhesion promoter (e.g., A-174 silane).

Then the parylene surface 104 is mildly treated with oxygen plasma, then roughened and treated again with the parylene adhesion promoter. This is done to improve the adhesion of a metal layer on it. Next an aluminum (Al) layer 106 (e.g., approx. 0.5 µm thick) is sputter deposited and patterned on the parylene surface 104. Subsequently, a fluoropolymer coating 108 (e.g. Cytop) is used to provide a hydrophobic layer. The hydrophobic layer 108 is spin coated to form a very thin layer (e.g., 200-300 nm) and cured for several hours. Next, a low-temperature curing process is carried out in an inert atmosphere (e.g., $N_2$) to avoid sudden degradation of the underlying parylene layer 104 because degradation in the presence of oxygen at an elevated temperature reduces the tensile and dielectric strength of the parylene layer 104.

As illustrated in step (e), in various embodiments, an indium-tin-oxide (ITO) coated glass slip 106 with an orifice 110 (e.g., approx. 250 µm in diameter) is aligned and attached to the device with an SU-8 spacer 112 (e.g., approx. 25 µm thick), which provides the valve channel 24 for the liquid-film 10. The orifice 106 in the ITO coated glass slip 106 can be made via ablation by an excimer laser (e.g., wavelength=266 nm). After the orifice 106 is provided, the surface is rendered hydrophobic by application of a fluoropolymer coating 108 and cured for an hour (e.g., at 180° C.). As illustrated in step (f), in various embodiments, a patterned PZT ceramic 120 is bonded to the bottom side of the microfluidic valve 1 using a general purpose epoxy with an SU-8 spacer 112 (e.g., approx. 200 µm thick) therebetween. Finally, using a syringe, the liquid-film 10 is squeezed into the valve channel 24 through the orifice 110.

The microfluidic valve 1 having the immiscible, nonvolatile substantially flat, disk shaped thin mini/micro scale liquid-film 10, as described above, can be used to prevent evaporation of the system-fluid 6 through microscopic ports, e.g., through the microscopic orifice 5 of the microfluidic system nozzle 3. Accordingly, the microfluidic valve 1 having the immiscible, nonvolatile substantially flat, disk shaped thin mini/micro scale liquid-film 10, as described above, has immense potential in the prevention of clogging problems in various microfluidic systems having air-exposed microfluidic ports.

While the disclosure has been described in connection with specific embodiments thereof, it will be understood that the inventive methodology is capable of further modifications. This patent application is intended to cover any variations, uses, or adaptations of the disclosure following, in general, the principles of the disclosure and including such departures from the present disclosure as come within known or customary practice within the art to which the disclosure pertains and as may be applied to the essential features herein before set forth and as follows in scope of the appended claims.

What is claimed is:

1. A mini-scale microfluidic valve structured and operable to selectively cover and uncover a mini-scale microfluidic system fluid dispensing nozzle orifice, said valve comprising:
a substantially planar base member disposed on an outer surface of a mini-scale microfluidic system dispensing nozzle, the base member comprising a base orifice coaxially aligned with a fluid dispensing orifice of the mini-scale microfluidic system dispensing nozzle, the nozzle orifice providing a fluid dispensing pathway for dispensing system-fluid from the mini-scale microfluidic system to an external ambient environment, the base member further comprising an external substantially planar top surface that is exposed to the external ambient environment, wherein a fluid-air interface is present within the nozzle orifice between the external ambient environment and the system-fluid present in the nozzle orifice;
a liquid-film movably disposed on the base member external substantially planar top surface such that the liquid-film is exposed to the external ambient environment, the liquid-film comprising a substantially non-volatile liquid that is substantially immiscible with the system-fluid; and
a valve control subsystem structured and operable to control movement of the liquid-film along the top surface to selectively cover and uncover the nozzle orifice and thereby selectively close and open the fluid dispensing pathway.

2. The valve of claim 1, wherein the liquid-film comprises a liquid having a low surface tension such that the liquid-film assumes and retains a substantially flat thin disk-shape when disposed on the top surface, wherein one side of the liquid-film is exposed to the external ambient environment.

3. The valve of claim 2, wherein the low surface tension of the liquid-film provides a surface crawling characteristic whereby the liquid-film self-adheres to the top surface and easily moves along the top surface between the open and closed fluid dispensing pathway positions, as controlled by the valve control subsystem.

4. The valve of claim 1, wherein the base member comprises an outer surface of the dispensing nozzle.

5. The valve of claim 1, wherein the valve control subsystem comprises:
a plurality of electrodes disposed on the top surface such that the electrodes are in electrostatic communication with the liquid-film;
a power source electrically connected to the electrodes; and
a controller operable to control application of electrical fields from the power source to selected pairs of electrodes to generate electrostatic fields that cause the liquid-film to move along the top surface to selectively close and open the fluid dispensing pathway.

6. The valve of claim 5, wherein the electrodes are disposed within a dielectric layer disposed on the top surface.

7. The valve of claim 6, further comprising a hydrophobic coating layer disposed over the dielectric layer.

8. A mini-scale microfluidic valve structured and operable to selectively cover and uncover a mini-scale microfluidic system fluid dispensing nozzle orifice, said valve comprising:
a substantially planar base member disposed on an outer surface of a mini-scale microfluidic system dispensing nozzle, the base member comprising a bas orifice coaxially aligned with a fluid dispensing orifice of the mini-scale microfluidic system dispensing nozzle, the nozzle orifice providing a fluid dispensing pathway for dispensing system-fluid from the mini-scale microfluidic system to an external ambient environment, the base member further comprising an external substantially planar top surface that is exposed to the external ambient environment, wherein a fluid-air interface is present within the nozzle orifice between the external ambient environment and the system-fluid present in the nozzle orifice;
a liquid-film movably disposed on the base member external substantially planar top surface such that the liquid-film is exposed to the external ambient environment, the liquid-film comprising a substantially non-volatile, immiscible having a low surface tension such that the liquid-film assumes and retains a substantially flat thin disk-shape when disposed in the top surface, wherein one side of the liquid-film is exposed to the external ambient environment; and a valve control subsystem structured and operable to control movement of the liquid-film along the top surface to selectively cover and uncover the nozzle orifice and thereby selectively close and open the fluid dispensing pathway.

9. The valve of claim 8, wherein the low surface tension of the liquid-film provides a surface crawling characteristic whereby the liquid-film self-adheres to the top surface and easily moves along the top surface between the open and closed fluid dispensing pathway positions, as controlled by the valve control subsystem.

10. The valve of claim 8, wherein the base member comprises an outer surface of the dispensing nozzle and the valve further comprises an interstitial member connected to the base member and structured to define the open valve channel.

11. The valve of claim 8, wherein the valve control subsystem comprises:
   a plurality of electrodes disposed on the top surface such that the electrodes are in electrostatic communication with the liquid-film;
   a power source electrically connected to the electrodes; and
   a controller operable to control application of electrical fields from the power source to selected pairs of electrodes to generate electrostatic fields that cause the liquid-film to move along the top surface to selectively close and open the fluid dispensing pathway.

12. The valve of claim 11, wherein the electrodes are disposed within a dielectric layer disposed on the top surface.

13. The valve of claim 12, wherein a hydrophobic coating layer is disposed on the dielectric layer.

14. A mini-scale microfluidic valve structured and operable to selectively cover and uncover a mini-scale microfluidic system fluid dispensing nozzle orifice, said valve comprising:
   a substantially planar base member disposed on an outer surface of a mini-scale microfluidic system dispensing nozzle, the base member comprising a base orifice coaxially aligned with a fluid dispensing orifice of the mini-scale microfluidic system dispensing nozzle, the nozzle orifice providing a fluid dispensing pathway for dispensing system-fluid from the mini-scale microfluidic system to an external ambient environment, the base member further comprising an external substantially planar top surface that is exposed to the external ambient environment, wherein a fluid-air interface is present within the nozzle orifice between the external ambient environment and the system-fluid present in the nozzle orifice;
   a liquid-film movably disposed on the base member external substantially planar top surface such that one side of the liquid-film is exposed to the external ambient environment, the liquid-film comprising a substantially nonvolatile, immiscible liquid having a low surface tension such that the liquid-film has a substantially flat thin disk-shape when disposed top surface, and such that the liquid-film has a surface crawling characteristic whereby the liquid-film is self-adhered to the top surface and is easily moveable along the top surface; and
   a valve control subsystem structured and operable to control movement of the liquid-film along the top surface to selectively cover and uncover the nozzle orifice and thereby selectively close and open the fluid dispensing pathway.

15. The valve of claim 14, wherein the base member comprises an outer surface of the dispensing nozzle.

16. The valve of claim 14, wherein the valve control subsystem comprises:
   a plurality of electrodes disposed on the top surface such that the electrodes are in electrostatic communication with the liquid-film;
   a power source electrically connected to the electrodes; and
   a controller operable to control application of electrical fields from the power source to selected pairs of electrodes to generate electrostatic fields that cause the liquid-film to move along the top surface to selectively close and open the fluid dispensing pathway.

17. The valve of claim 16, wherein the electrodes are disposed within a dielectric layer disposed on the base member top surface.

18. The valve of claim 17, further comprising a hydrophobic coating layer disposed over the dielectric layer.

* * * * *